United States Patent
Park

(10) Patent No.: US 10,036,469 B2
(45) Date of Patent: Jul. 31, 2018

(54) NEUTRAL CONTROLLING METHOD OF SYNCHRONIZER

(71) Applicant: HYUNDAI MOTOR COMPANY, Seoul (KR)

(72) Inventor: Jong Yun Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 464 days.

(21) Appl. No.: 14/836,844

(22) Filed: Aug. 26, 2015

(65) Prior Publication Data

US 2016/0230887 A1 Aug. 11, 2016

(30) Foreign Application Priority Data

Feb. 10, 2015 (KR) .................... 10-2015-0020311

(51) Int. Cl.
*F16H 61/28* (2006.01)
*F16H 63/20* (2006.01)

(52) U.S. Cl.
CPC ............ *F16H 61/28* (2013.01); *F16H 63/20* (2013.01); *F16H 2061/2823* (2013.01)

(58) Field of Classification Search
CPC ............ F16H 61/28; F16H 2061/2823; F16H 2061/283; F16H 63/20
See application file for complete search history.

(56) References Cited

U.S. PATENT DOCUMENTS

| 6,393,928 | B1 * | 5/2002 | Watanabe | F16H 61/0403 74/336 R |
| 2002/0000133 | A1 * | 1/2002 | Yamamoto | F16H 61/32 74/335 |
| 2009/0105913 | A1 * | 4/2009 | Leibbrandt | F16H 61/28 701/51 |
| 2016/0146341 | A1 * | 5/2016 | Hoefflin | F16H 61/30 74/336 R |

FOREIGN PATENT DOCUMENTS

| JP | 2002139147 A | 5/2002 |
| JP | 2004052862 A | 2/2004 |
| JP | 2008302821 A | 12/2008 |
| KR | 10-20040034451 A | 4/2004 |
| KR | 10-2013-0045085 A | 5/2013 |
| KR | 10-2013-0128169 A | 11/2013 |

* cited by examiner

*Primary Examiner* — Huan G Le
(74) *Attorney, Agent, or Firm* — Brinks Gilson & Lione

(57) ABSTRACT

A neutral controlling method of a synchronizer includes: a primary moving step of moving a sleeve in one direction by a shift mechanism until the sleeve contacts a first stopper of a first clutch gear; a secondary moving step of moving the sleeve in the other direction by the shift mechanism until the sleeve contacts a second stopper of a second clutch gear; and a neutral position moving step of moving the sleeve to a neutral position between the two clutch gears. In particular, in the neutral position moving step, the sleeve moves in one direction as much as a half of a stroke and the stroke of the sleeve is a summed value of a straight distance between the first stopper and the second stopper with an invalid stroke formed due to a clearance between parts of the shift mechanism and the synchronizer.

10 Claims, 3 Drawing Sheets

NEUTRAL CONTROLLING METHOD OF SYNCHRONIZER

CROSS-REFERENCE TO RELATED APPLICATION

This application claims the benefit of Korean Patent Application No. 10-2015-0020311, filed on Feb. 10, 2015, which is hereby incorporated by reference herein in its entirety.

FIELD

The present disclosure relates to a synchronizer used in a transmission, and more particularly, to a neutral controlling method of a synchronizer.

BACKGROUND

The statements in this section merely provide background information related to the present disclosure and may not constitute prior art.

A synchronizer which is mainly used in a multi-ratio transmission is configured to selectively couple any one of two driving gears, which are running idle on an outer circumferential surface of a major shaft, to the major shaft and synchronize the major shaft with a rotating speed of the selected driving gear to reduce a shifting shock.

Figure 1:
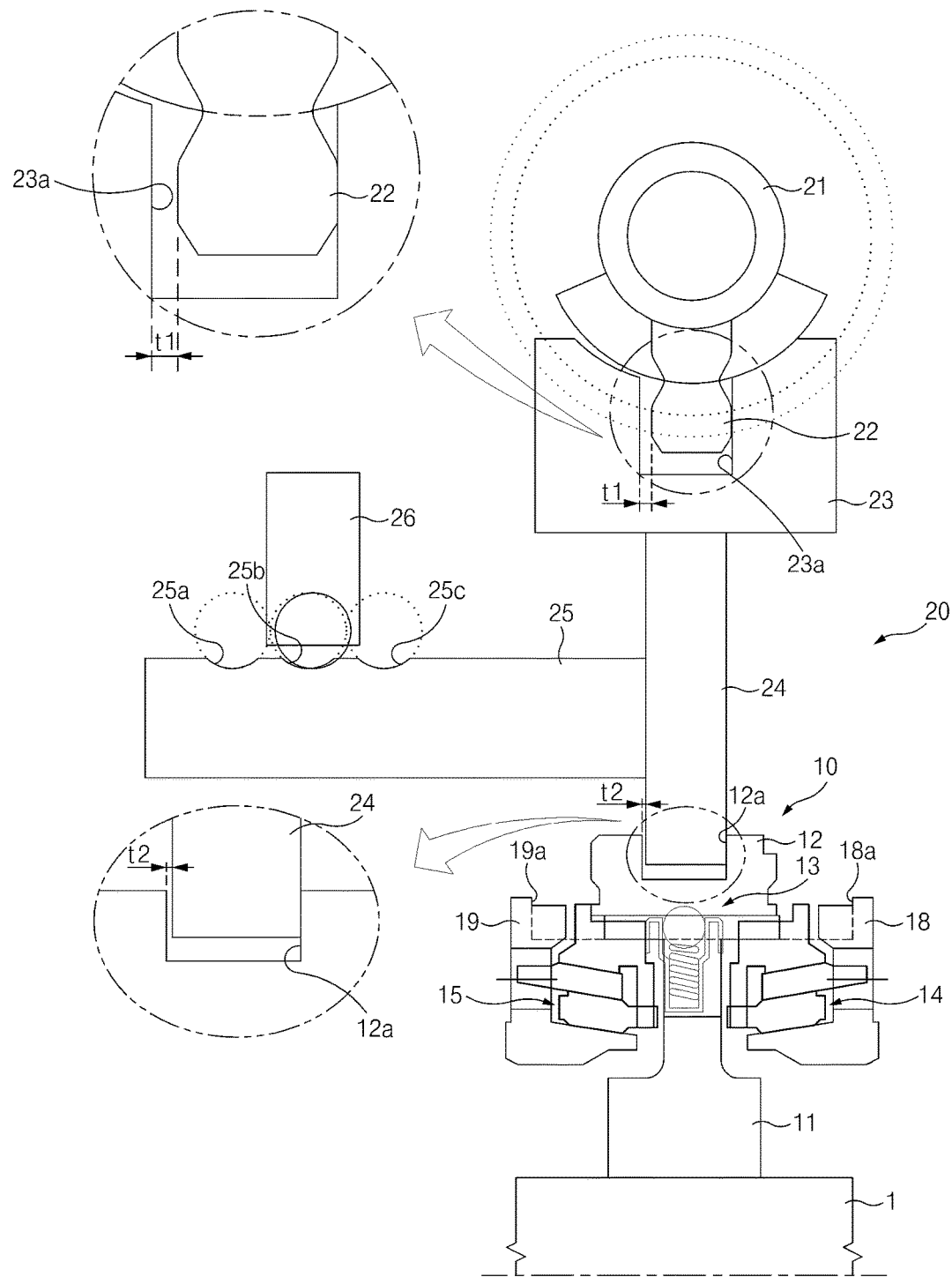

FIG. 1 is an exemplified diagram of a synchronizer 10 and a shift mechanism 20 connected to the synchronizer 10 to move the synchronizer 10.

The major shaft 1 to which power is delivered is installed in the synchronizer 10 and both ends of the synchronizer 10 are each provided with first and second clutch gears 18 and 19, in which each of the clutch gears 18 and 19 are integrally formed in each driving gear (not illustrated) and both ends of the synchronizer 10 are provided with two driving gears. A gear combination of the two driving gears, for example, may include one shift and two shift driving gears, or one shift and three shift driving gears, etc.

The synchronizer 10 includes a hub 11 connected to an outer circumferential surface of the major shaft 1 through a spline, etc., a sleeve 12 configured to move along a longitudinal direction (left and right on the page of FIG. 1, shown by phantom line) of the major shaft 1 while engaging with an outer circumferential surface of the hub 11 through a spline, etc., a key unit 13 provided on the outer circumferential surface of the hub 11 and configured to contact an inner circumferential surface of the sleeve 12, and first and second rings 14 and 15 provided on both surfaces of the hub 11.

The shift mechanism 20 includes an actuator 21, a finger 22 protruding radially from an output shaft of the actuator 21, a lug 23 into which the finger 22 is inserted, a shift fork 24 extending from the lug 23 to the sleeve 12 of the synchronizer 10, a shift rail 25 extending in a length direction from one side of the shift fork 24, etc.

The lug 23 is provided with a groove part 23a and the finger 22 is coupled with the groove part 23a of the lug 23.

The outer circumferential surface of the sleeve 12 is provided with the groove part 12a, and a lower end of the shift fork 24 is inserted into the groove part 12a of the sleeve 12.

The shift rail 25 is provided with a plurality of locking grooves 25a, 25b, and 25c and the locking grooves 25a, 25b, and 25c of the shift rail 25 are configured to selectively lock a plug 26 according to corresponding shift stages.

As the shift fork 24 horizontally moves along the longitudinal direction of the major shaft 1 through the finger 22 and the lug 23 of the actuator 21, the ring 14 of the synchronizer 10 is pressed to any one of the first and second clutch gears 18 and 19 to engage the sleeve 12 of the synchronizer 10 with the corresponding clutch gears 18 and 19 and couple the driving gears of the corresponding clutch gears 18 and 19 with the major shaft 1, such that the rotating speed of the sleeve 12 of the synchronizer 10 may synchronize with the rotating speed of corresponding driving gear.

Further, when the synchronizer 10 moves to a neutral position, a contact of the synchronizer 10 with the first and second clutch gears 18 and 19 may be released, and preferably completely out of contact.

Meanwhile, it has been discovered that, a first clearance t1 formed between the finger 22 and the groove part 23a of the lug 23 and a second clearance t2 formed between the shift fork 24 and the groove part 12a of the sleeve 12, which are provided to make the driving of the shift mechanism 20 more smooth, can act as an invalid stroke at the time of the movement of the sleeve 12 and the finger 22.

When the invalid stroke occurs due to the first and second clearances t1 and t2 at the time of the neutral control of the synchronizer 10, the sleeve 12 and the finger 22 of the synchronizer 10 are biased to any one side, and therefore the key unit 13 may not be positioned at a center between the two rings 14 and 15.

As such, when the key unit 13 is not positioned at the center between the first and second rings 14 and 15 but is biased to one side, the key unit 13 of the synchronizer 10 contacts any one of the rings 14 and 15 or is not properly spaced apart the rings and therefore a burning damage of the rings 14 and 15 occurs or an interval between the key unit 13 and the rings 14 and 15 is not secured properly while a vehicle is driving to cause a friction and a drag, such that fuel efficiency may be greatly aggravated.

SUMMARY

The present disclosure provides a neutral controlling method of a synchronizer capable of accurately positioning a sleeve of the synchronizer at a neutral position at the time of the neutral control of the synchronizer to position a key unit at a center between two rings and thus inhibit or prevent undesired situations such as burning damage, friction, and drag of the ring, thereby greatly improving fuel efficiency.

According to an exemplary embodiment of the present disclosure, a neutral controlling method of a synchronizer, includes:

a primary moving step of moving a sleeve in one direction by a shift mechanism until the sleeve contacts a first stopper of a first clutch gear; a secondary moving step of moving the sleeve in the other direction by the shift mechanism until the sleeve contacts a second stopper of a second clutch gear; and a neutral position moving step of moving the sleeve to a neutral position between the two clutch gears, wherein in the neutral position moving step, the sleeve moves in one direction as much as a half of a full stroke of the sleeve, and the full stroke of the sleeve is a summed value of a straight distance between the first stopper and the second stopper with an invalid stroke formed due to a clearance between parts of the shift mechanism and the synchronizer.

The invalid stroke may be a first clearance between a finger and a lug of the shift mechanism.

The invalid stroke may be a summed value of a first clearance between a finger and a lug of the shift mechanism and a second clearance between a shift fork of the shift mechanism and a groove part of the sleeve.

After the neutral position moving step, a finger of the shift mechanism may move in the other direction as much as a half of the invalid stroke to position the finger around a center of the lug.

According to another exemplary embodiment of the present disclosure, a neutral controlling method of a synchronizer includes: alternately contacting a sleeve of the synchronizer with a first clutch gear and a second clutch gear to calculate a straight distance between the first and second clutch gears and then move the sleeve to a neutral position between the first and second clutch gears, wherein the neutral positions of the first and second clutch gears are a half of a summed value of a straight distance between the first clutch gear and the second clutch gear with an invalid stroke formed due to a clearance between parts of the synchronizer and the shift mechanism.

The invalid stroke may be a first clearance between a finger and a lug of the shift mechanism.

The invalid stroke may be a summed value of a first clearance between a finger and a lug of the shift mechanism and a second clearance between a shift fork of the shift mechanism and a groove part of the sleeve.

After moving the sleeve to a neutral position between the first and second clutch gears, the finger may move as much as a half of the invalid stroke so that the finger of the shift mechanism is positioned at a center of the lug.

Further areas of applicability will become apparent from the description provided herein. It should be understood that the description and specific examples are intended for purposes of illustration only and are not intended to limit the scope of the present disclosure.

DRAWINGS

Figure 2:
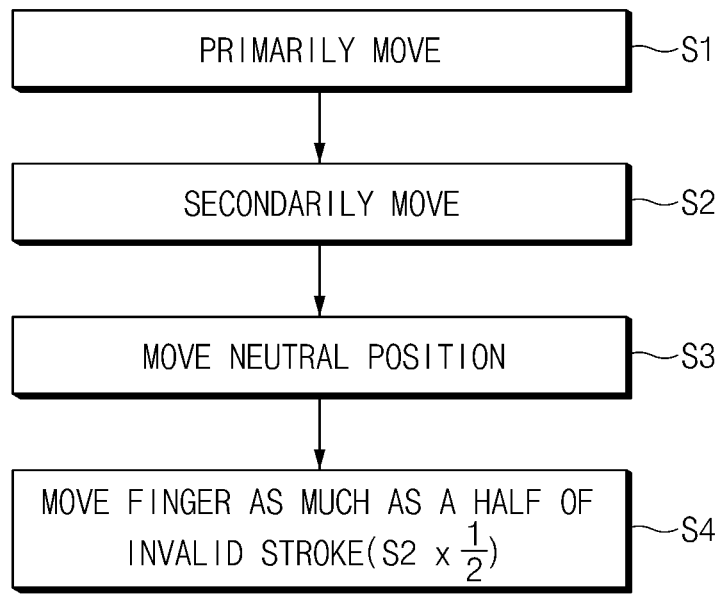
Figure 3:
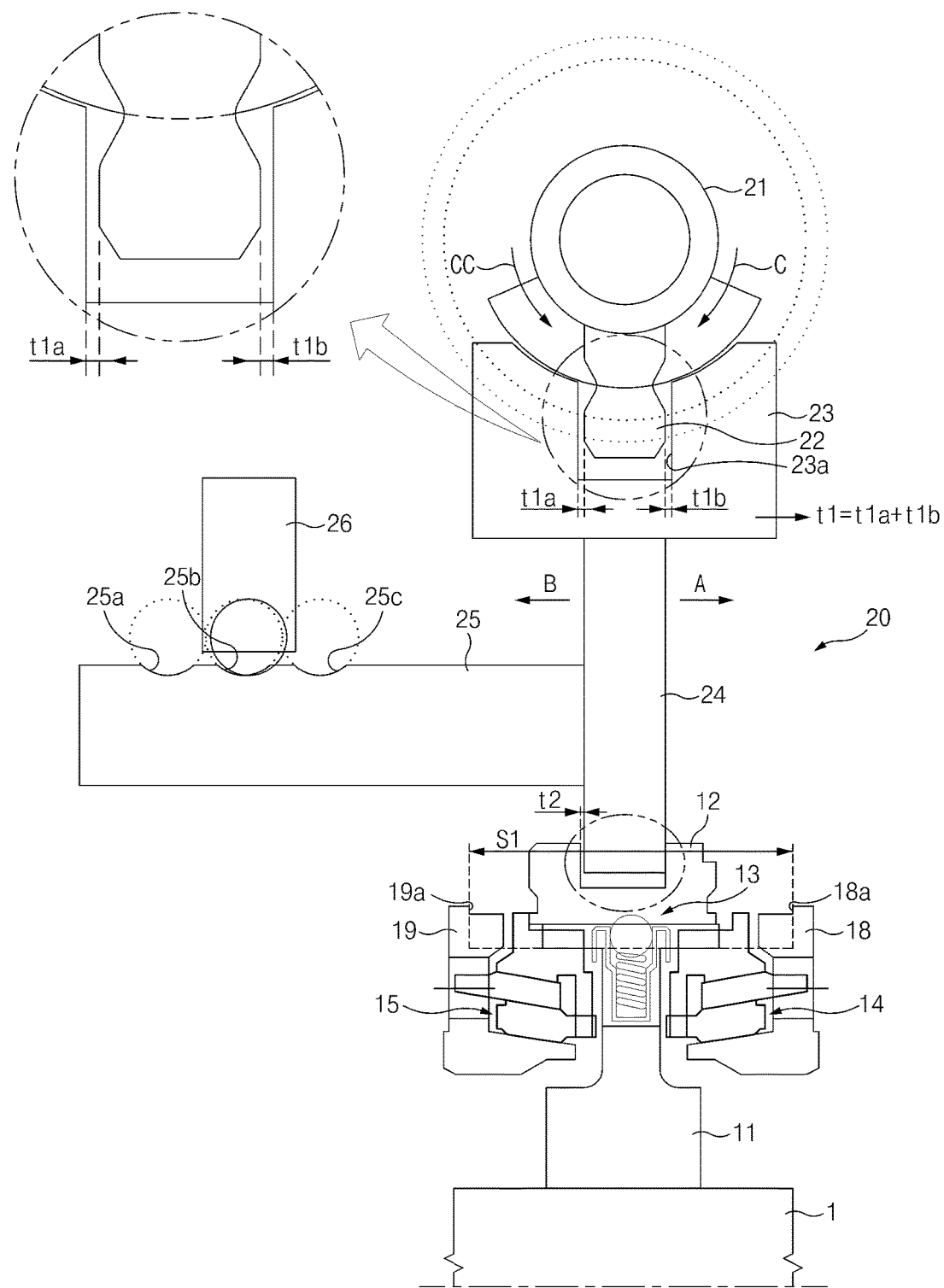

In order that the disclosure may be well understood, there will now be described various forms thereof, given by way of example, reference being made to the accompanying drawings, in which:

FIG. 1 is an exemplified diagram of a synchronizer and a shift mechanism connected to the synchronizer to move the synchronizer;

FIG. 2 is a flow chart illustrating a neutral controlling method of a synchronizer according to an exemplary embodiment of the present disclosure; and FIG. 3 is a diagram illustrating a state in which a key unit is positioned at a center between two rings as a sleeve moves to a neutral position by the neutral controlling method of a synchronizer according to the exemplary embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For reference, a size, a thickness of a line, and the like of components which are illustrated in the drawing referenced for describing exemplary embodiments of the present disclosure may be slightly exaggerated for convenience of understanding. Further, terms used to describe the present disclosure are defined in consideration of functions in the present disclosure and therefore may be changed depending on an intention, a practice, and the like of a user and an operator. Therefore, the definition of the terminologies should be construed based on the contents throughout the specification.

Referring to FIGS. 2 and 3, the neutral controlling method of a synchronizer according to the exemplary embodiment of the present disclosure includes a primary moving step (S1), a secondary moving step (S2), and a neutral position moving step (S3).

The primary moving step (S1):

When the actuator 21 of the shift mechanism 20 rotates in one direction (e.g. arrow direction CC of FIG. 3), a finger 22 rotates in the same direction as an actuator 21 in a groove part 23a of a lug 23 and thus the lug 23 and the shift fork 24 move in one direction (i.e. arrow direction A of FIG. 3). The sleeve 12 moves in one direction (i.e. arrow direction A of FIG. 3) by moving the shift fork 24 until one end of the sleeve 12 contacts a first stopper 18a of a first clutch gear 18 (S1).

The secondary moving step (S1):

After the primary moving step (S1), when the actuator 21 of the shift mechanism 20 rotates in the other direction (e.g. arrow direction C of FIG. 3), the finger 22 rotates in the same direction as the actuator 21 in the groove part 23a of the lug 23 and thus the lug 23 and the shift fork 24 move in the other direction (i.e. arrow direction B of FIG. 3). The sleeve 12 moves in the other direction (i.e. arrow direction B of FIG. 3) by moving the shift fork 24 until the other end of the sleeve 12 contacts a second stopper 19a of a second clutch gear 19 (S2).

The neutral position moving step (S3):

After the secondary moving step (S2), the actuator 21 of the shift mechanism 20 rotates in one direction (e.g. arrow direction CC of FIG. 3) and thus the sleeve 12 moves in one direction (i.e. arrow direction A of FIG. 3) by the lug 23 and the shift fork 24, such that the sleeve 12 is positioned around a neutral position between the first clutch gear 18 and the second clutch gear 19 (S3).

In the neutral position moving step (S3), the sleeve 12 moves as much as a half distance S/2 of a full stroke S of the sleeve 12.

In particular, the full stroke S of the sleeve 12 is a summed value (e.g. S=S1+S2) of a straight distance S1 between the first stopper 18a and the second stopper 19a, and an invalid stroke S2. The invalid stroke S2 may be calculated by a clearance between the respective parts of the shift mechanism 20 and the synchronizer 10 (e.g., between a finger 22 and a lug 23, and/or a shift fork 24 and a sleeve 12).

As such, the exemplary embodiment of the present disclosure sums the invalid stroke S2, which may be calculated by the clearance between the respective parts (e.g. a finger 22, a lug 23, and/or a shift fork 24) of the shift mechanism 20 and the synchronizer 10 (e.g., a sleeve 12), with the distance S1 between the first and second stoppers 18a and 19a, and thus sets the summed value (S=S1+S2) as the actual stroke S (e.g., full stroke) of the sleeve 12 to accurately position the sleeve 12 of the synchronizer 10 in the neutral position, such that the key unit 13 of the synchronizer 10 may be positioned at or around the center between the first and second rings 14 and 15 as illustrated in FIG. 3. As a result, the key unit 13 is appropriately spaced apart from any one of the rings to effectively prevent or inhibit undesired situations such as burning damage, friction, and drag of the ring, thereby significantly improving fuel efficiency.

According to the exemplary embodiment of the present disclosure, the invalid stroke S2 may be formed of a first clearance t1=t1a+t1b which is formed between the finger 22 and the groove part 23a of the lug 23 in the shift mechanism 20.

According to another exemplary embodiment of the present disclosure, the invalid stroke S2 may be formed of a summed value S2=t1+t2 of the first clearance t1=t1a+t1b which is formed between finger 22 and the groove part 23a of the lug 23 in the shift mechanism 20 and a second clearance t2 between the shift fork 24 and the groove part 12a of the sleeve 12 in the shift mechanism 20.

Further, after the neutral position moving step (S3), the finger 22 moves in the other direction (e.g. once the finger 22 moved in direction A in the previous step, it moves in direction B of FIG. 3) as much as a half (S2×½) of the invalid stroke S2 by rotating the actuator 21 of the shift mechanism 20 in the other direction (e.g. arrow direction C of FIG. 3), and as a result the finger 22 of the shift mechanism 20 may be positioned around the center of the groove part 23a of the lug 23. As illustrated in an enlarged view of FIG. 3, t1a and t1b which are the first clearance t1 between the finger 22 and the lug 23 become the same length (i.e. t1a=t1b) as each other.

As such, the finger 22 of the shift mechanism 20 is positioned around the center of the groove part 23a of the lug 23, and as a result the neutral control of the synchronizer 10 may be more precisely performed.

According to the exemplary embodiments of the present disclosure, it is possible to more precisely move the sleeve in consideration of the invalid stroke due to the clearance between the respective parts of the shift mechanism and the synchronizer, etc., at the time of the movement of the sleeve, when the sleeve of the synchronizer is accurately positioned at the neutral position at the time of the neutral control of the synchronizer and thus effectively prevent or inhibit the phenomena such as the burning damage, the friction, and the drag of the ring by positioning the key unit around the center of the two rings, thereby significantly improving the fuel efficiency.

What is claimed is:

1. A neutral controlling method of a synchronizer of a transmission, comprising:
    a primary moving step of moving a sleeve in a first direction by a shift mechanism until the sleeve contacts a first stopper of a first clutch gear;
    a secondary moving step of moving the sleeve in a second direction opposite to the first direction by the shift mechanism until the sleeve contacts a second stopper of a second clutch gear; and
    a neutral position moving step of moving the sleeve to a neutral position between the first and second clutch gears,
    wherein in the neutral position moving step, the sleeve moves in the first direction as in the primary moving step as much as a half of a full stroke of the sleeve, and the full stroke of the sleeve is a summed value of a straight distance between the first stopper and the second stopper with an invalid stroke formed by a clearance between parts of the shift mechanism and the synchronizer.

2. The neutral controlling method according to claim 1, wherein the invalid stroke is a first clearance between a finger and a lug of the shift mechanism.

3. The neutral controlling method according to claim 1, wherein the invalid stroke is a summed value of a first clearance between a finger and a lug of the shift mechanism and a second clearance between a shift fork of the shift mechanism and a groove part of the sleeve.

4. The neutral controlling method according to claim 1, further comprising a step of moving a finger of the shift mechanism in the second direction as much as a half of the invalid stroke to position the finger around a center of a lug after the neutral position moving step.

5. A neutral controlling method of a synchronizer of a transmission, comprising:
    calculating a straight distance between a first and a second clutch gears by alternately contacting a sleeve of the synchronizer with the first and second clutch gears; and
    moving the sleeve to a neutral position between the first and second clutch gears,
    wherein the neutral position of the first and second clutch gears is a half of a summed value of the straight distance between the first clutch gear and the second clutch gear with an invalid stroke formed by a clearance between parts of the synchronizer and a shift mechanism.

6. The neutral controlling method according to claim 5, wherein the invalid stroke is a first clearance between a finger and a lug of the shift mechanism.

7. The neutral controlling method according to claim 5, wherein the invalid stroke is a summed value of a first clearance between a finger and a lug of the shift mechanism and a second clearance between a shift fork of the shift mechanism and a groove part of the sleeve.

8. The neutral controlling method according to claim 5, further comprising a step of moving a finger of the shift mechanism in a direction as much as a half of the invalid stroke to position the finger around a center of a lug after moving the sleeve to the neutral position between the first and second clutch gears.

9. In a transmission comprising a synchronizer selectively coupling an idling gear to a drive shaft and a shift mechanism connected to the synchronizer, the synchronizer comprising a hub connected to the drive shaft, a sleeve engaging with an outer surface of the hub and configured to move along a longitudinal direction of the drive shaft, first and second clutch gears configured to engage with the sleeve, the shift mechanism comprising an actuator, a finger protruding from the actuator, and a lug into which the finger is inserted, the actuator moving the sleeve in a neutral position according to a method comprising:
    a primary moving step of moving the sleeve in one direction until the sleeve contacts a first stopper of the first clutch gear;
    a secondary moving step of moving the sleeve in an opposite direction to the primary moving step until the sleeve contacts a second stopper of the second clutch gear; and
    a neutral position moving step of moving the sleeve to the neutral position between the first and second clutch gears,
    wherein in the neutral position moving step, the sleeve moves a predetermined distance in the same direction as in the primary moving step, and
    the predetermined distance is calculated based on a straight distance between the first stopper and the second stopper and an invalid stroke formed by at least one clearance between the finger and the lug.

10. The method according to claim 9, the predetermined distance corresponds to a half of a full stroke of the sleeve, the full stroke being a sum of the straight distance and the invalid stroke.

* * * * *